(12) United States Patent
Crawford

(10) Patent No.: US 11,063,442 B2
(45) Date of Patent: Jul. 13, 2021

(54) ENERGY GENERATION, STORAGE AND MANAGEMENT SYSTEM

(71) Applicant: Neil Crawford, Winnipeg (CA)

(72) Inventor: Neil Crawford, Winnipeg (CA)

( * ) Notice: Subject to any disclaimer, the term of this patent is extended or adjusted under 35 U.S.C. 154(b) by 0 days.

(21) Appl. No.: 16/567,547

(22) Filed: Sep. 11, 2019

(65) Prior Publication Data

US 2020/0343733 A1 Oct. 29, 2020

(30) Foreign Application Priority Data

Apr. 24, 2019 (WO) .................. PCTCA2019050517

(51) Int. Cl.
| | |
|---|---|
| *H02J 4/00* | (2006.01) |
| *H02S 10/10* | (2014.01) |
| *H02J 9/00* | (2006.01) |
| *H02J 11/00* | (2006.01) |
| *H02J 15/00* | (2006.01) |

(52) U.S. Cl.
CPC ................ *H02J 4/00* (2013.01); *H02J 9/002* (2013.01); *H02J 11/00* (2013.01); *H02J 15/003* (2013.01); *H02S 10/10* (2014.12)

(58) Field of Classification Search
CPC ....................................................... H02J 4/00
USPC .......................................................... 307/26
See application file for complete search history.

(56) References Cited

U.S. PATENT DOCUMENTS

| | | | |
|---|---|---|---|
| 6,745,105 B1 * | 6/2004 | Fairlie .................... | B60L 58/34 700/273 |
| 6,918,430 B2 | 7/2005 | Myasnikov et al. | |
| 9,217,412 B2 | 12/2015 | Blake et al. | |
| 2006/0137348 A1 | 6/2006 | Pas | |
| 2007/0276547 A1 * | 11/2007 | Miller ..................... | H02J 3/00 700/295 |
| 2009/0076661 A1 * | 3/2009 | Pearson ................... | H02J 7/34 700/291 |
| 2009/0115190 A1 * | 5/2009 | Devine .................... | F03D 9/19 290/44 |

(Continued)

OTHER PUBLICATIONS

PCT/CA2019/050517 International Search report and written opinion.

*Primary Examiner* — Adi Amrany
(74) *Attorney, Agent, or Firm* — Kyle R Satterthwaite; Michael R Williams; Ade & Company Inc

(57) ABSTRACT

A system for generating, storing and managing energy features a solar-power center, a wind-power center, a hydrogen-power center with hydrogen fuel cells, a hydrogen supply center operable for producing hydrogen, and an energy storage center with both hydrogen storage tanks and one or more rechargeable batteries. An energy management subsystem monitors energy consumption from the system and available energy reserves at the power storage center, and manages the different centers based at least partly on the monitored consumption and reserves. A cooling loop circulates hydrogen for cooling of mechanical and electrical equipment, while heating loops use fuel cell waste heat and collected solar thermal energy for heat-requiring applications, such as warming of the battery storage in cold weather climates. Black-out/brown-out restart capability is included, as well as novel wind turbines whose rotor heights are autonomously adjusted to an optimal elevation based on wind conditions.

20 Claims, 10 Drawing Sheets

(56) References Cited

U.S. PATENT DOCUMENTS

| | | | |
|---|---|---|---|
| 2011/0295610 A1* | 12/2011 | Wei | G06Q 50/06 |
| | | | 705/1.1 |
| 2012/0133209 A1* | 5/2012 | O'Brien | H02J 3/1828 |
| | | | 307/72 |
| 2013/0046415 A1* | 2/2013 | Curtis | H02J 3/383 |
| | | | 700/297 |
| 2017/0117716 A1 | 4/2017 | Wolter | |
| 2019/0182766 A1* | 6/2019 | Eleftheriadis | H04W 52/0206 |

* cited by examiner

ENERGY GENERATION, STORAGE AND MANAGEMENT SYSTEM

CROSS-REFERENCE TO RELATED APPLICATIONS

This application claims foreign priority benefit under 35 U.S.C. 119(a) of International Patent Application No. PCT/CA2019/050517, filed Apr. 24, 2019, which claims benefit under 35 U.S.C. 119(e) of U.S. Provisional Application No. 62/662,427, filed Apr. 25, 2018, both of which are incorporated herein by reference in their entirety.

FIELD OF THE INVENTION

The present invention relates generally to electrical energy generation, and more specifically to an electrical energy generation system which can serve as a primary power generation means with multiple electrical generation means and combined energy storage to accommodate varying load requirements and operating conditions.

BACKGROUND

Alternative energy sources are gaining popularity relative to conventional means for electrical energy generation. In the prior art, such alternative energy sources have been utilized individually, and in constrained combinations, including a) wind power alone with direct DC to AC conversion for power grid distribution; b) solar power alone with DC storage followed by DC to AC conversion on demand; c) hydrogen fuel cells relying on stored hydrogen to produce electrical energy on demand; d) solar power together with HFCs and hydrogen storage; and e) wind and solar power combinations employing energy storage using batteries or capacitors.

However, there remains room for further improvement in the growing need for alternative energy solutions, in response to which Applicant has developed a novel solution for generating, storing and managing electrical energy using alternative energy sources with an incorporated energy storage system.

SUMMARY OF THE INVENTION

According to a first aspect of the invention, there is provided a system for generating, storing and managing energy, said system comprising:
a solar-power center comprising a solar array operable to generate electricity from solar energy;
a wind-power center comprising at least one wind turbine operable to generate electricity from wind energy;
a hydrogen-power center comprising hydrogen fuel cells operable to generate electricity from a supply of hydrogen;
a hydrogen supply center operable to produce hydrogen; and
an energy storage center comprising:
hydrogen storage fluidly connected between the hydrogen supply center and the hydrogen power center to store hydrogen produced by the hydrogen supply center for subsequent use by the hydrogen-power center; and
electrical storage comprising one or more rechargeable batteries for storing electricity generated by one or more of the solar, wind and hydrogen centers;
a shared electrical distribution center electrically connected to each of the solar-power, wind-power and hydrogen-power centers to distribute the electricity generated thereby to one or more loads; and
a computerized energy management system electrically connected to the power storage center to monitor energy reserves thereat, to the shared electrical distribution center to monitor power conditions thereat, and to manage the different centers based at least partly on said monitored energy reserves and power conditions.

According to a second aspect of the invention, there is provided a system for generating, storing and managing energy, said system comprising:
a hydrogen-power center comprising hydrogen fuel cells operable to generate electricity from a supply of hydrogen; and
one or more renewable energy power centers operable to generate electrical energy from a renewable resource;
a hydrogen supply center operable to produce hydrogen; and
an energy storage center comprising hydrogen storage fluidly connected between the hydrogen supply center and the hydrogen power center to store hydrogen produced by the hydrogen supply center for subsequent use by the hydrogen-power center; and
at least one of:
a hydrogen-based cooling loop that runs between the hydrogen storage and one or more coolant-requiring applications and is operable to transfer excess heat from said one or more coolant-requiring applications to circulated hydrogen from said hydrogen storage;
a fuel-cell-heated heating loop that runs between the hydrogen-power center and one or more heat-requiring applications to transfer waste heat from the hydrogen fuel cells to said one or more heat-requiring applications; and/or
a renewably-heated heating loop that runs between one of the renewable energy power centers and one or more heat-requiring applications to transfer collected thermal energy from said one of the renewable energy power centers to said one or more heat-requiring applications.

According to a third aspect of the invention, there is provided a wind turbine comprising a rotor carried atop a height adjustable structure, and operable to automatically adjust the height of said structure to change an elevation at which a rotor of the turbine resides to optimize performance of the wind-turbine based on based on airstream conditions at varying elevations.

BRIEF DESCRIPTION OF THE DRAWINGS

Preferred embodiments of the invention will now be described in conjunction with the accompanying drawings in which.

DETAILED DESCRIPTION

Figure 1:
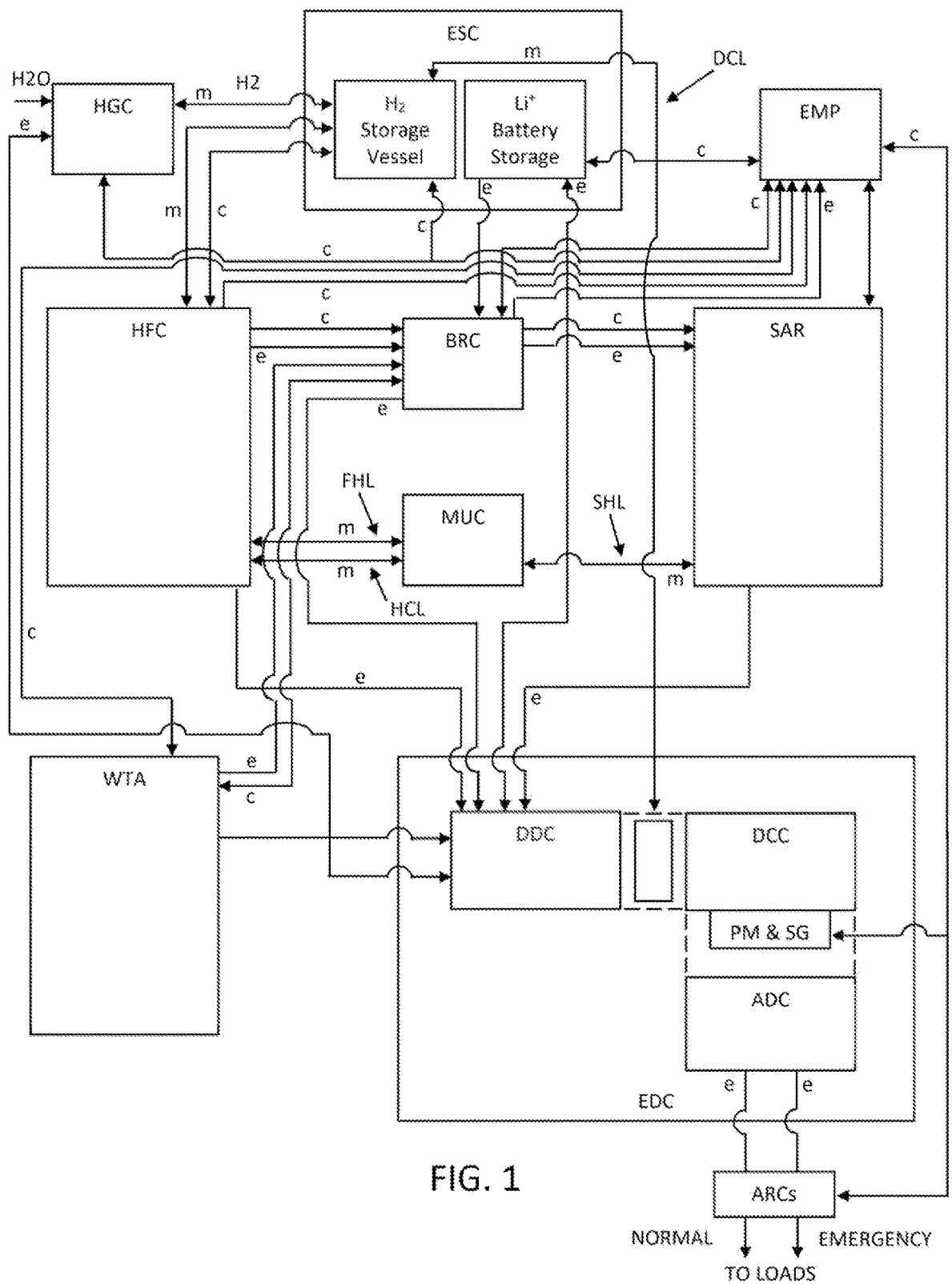
FIG. 1 is a schematic block diagram of an energy generation, storage and management system according to one embodiment of the present invention.

FIG. 1 schematically illustrates a system of the present invention for generating, storing and managing energy ("The System"). The system generates electricity from three different alternative energy resources, namely hydrogen, solar energy and wind energy. To do so, the system includes a solar-power center, a hydrogen-power center and a wind-power center.

The solar-power center comprises a solar array operable to generate electricity from renewable solar energy, and thus is also referred to herein as a Solar Array Center (SAC). In preferred embodiments, in addition to generation of electricity, the SAC is also operable to collect solar thermal energy for other uses, for example using photovoltaic thermal hybrid solar collectors that comprise both photovoltaic cells and thermal collectors. Such hybrid solar collectors are known in the art, and thus not described in further detail herein.

The wind-power center comprises at least one wind turbine operable to generate electricity from renewable wind energy, and preferably an array of such wind turbines, and is therefore also referred to herein as a Wind Turbine Array (WTA). Each of the wind turbines in the WTA preferably incorporates the latest state of the art optimization techniques to adjust the wind turbine according to detected ambient conditions (wind speed, wind direction, etc.), plus a novel elevational optimization functionality disclosed herein in further detail below.

The hydrogen-power center comprises hydrogen fuel cells (HFCs) arranged in one or more stacks, and thus is also referred to herein as an HFC stack. A hydrogen supply center provides a supply of hydrogen for the HFC stack, for example generating the hydrogen through electrolysis of an incoming supply of water, and is therefore also referred to herein as a Hydrogen Generation Center (HGC).

In FIG. 1, fluid lines for conveying fluid media between various locations are labelled "m" for media flow, electrical lines for transmitting electrical power are labeled "e" for electrical power flow, and communication lines for conveying control signals relating to monitoring and operation of the system and its various components are labeled "c" for control signal flow.

To store some of the energy produced by the various power centers, the system also features an energy storage center (ESC) that incorporates both hydrogen storage (ES-$H_2$), in the form of one or more storage tanks or vessels, and electrical storage, in the form of one or more rechargeable lithium batteries (ES-$Li^+$). The hydrogen storage ES-$H_2$ is fluidly connected to the hydrogen supply center HGC through one or more fluid lines "m" so that the produced hydrogen is held in the hydrogen storage for subsequent consumption by the hydrogen-power center when needed. The electrical storage ES-$Li^+$ is electrically connected to each of the power centers, WTA, HFC and SAC for charging of the batteries by any one or more of the mentioned power centers. In the illustrated example, this electrical connection between the electrical storage ES-$Li^+$ and each power center is a connection via a DC Distribution Center (DDC) which is shared DC electrical distribution center in the EDC through which electrical power generated by each power center is distributed to one or more connected loads if DC and/or after DC to AC conversion (DCC) if the load requires AC through a combination of feeders that are connected to external loads situated down-grid from the system, and a local station transformer that serves internal AC electrical loads of "The System" for both critical and non critical operations.

The electrical distribution center EDC features the previously noted DC Distribution Center (DDC) at which the DC power generated from the various power centers is collected, and from which DC power generated by the power centers may be delivered to one or more internal DC loads; a DC-to-AC Conversion Center (DDC) at which DC power generated by the power centers and received at the DDC is converted to AC power, and an AC Distribution Center (ADC) from which the converted AC power is delivered to the internal and external AC loads through a local station transformer in the case of internal loads, and through the feeders and distribution transformers in the case of external loads. Each of the three power centers HFC, SAC, WTA are electrically connected to the DDC via respective electrical lines "e", while another of the electrical lines "e" connects the DDC to the electrical storage ES-$Li^+$ of the ESC to enable charging of the batteries thereof by the generated electrical energy.

A computerized energy management system responsible for monitoring and control of the overall system may be embodied in a singular control panel, and is therefore also referred to herein as an energy management panel (EMP). The EMP is connected by respective control lines c to the various power centers HFC, SAC, WTA to monitor and control operation thereof. The EMP may employ a programmable logic controller whose various inputs are connected to an array of sensors monitoring operation conditions of the system and environmental conditions in which the system and subcomponents thereof are operating, for example including but not limited to: temperature and/or humidity sensors monitoring local operating environments at some or all of the centers, pressure and or flow sensors monitoring media flow conditions in the media flow lines "m"; and ambient condition sensors monitoring ambient environmental conditions relevant to operation of the system, for example including wind conditions relevant to operation of the wind-power center WTA, and sunlight conditions relevant to operation of the solar-power center SAC. Alternatively, instead of on-site ambient environment sensors, ambient environmental data may be communicated to the EMP from external sources, e.g. an outside weather service that already monitors and reports on weather conditions at the geographic area in which the system in intended to operate and resides. Through one or more of the control lines "c", the EMP is also connected to a power monitor PM of the EDC to monitor, along with other output power characteristics of the system, energy consumption therefrom by the connected loads.

The EMP comprises at least one computer processor having non-transitory computer readable memory that is connected thereto and stores statements and instructions executable by the processor(s) to monitor the incoming system and environmental condition data and perform autonomous logic control of the system based on such data. Of the three power centers HFC, SAC, WTA, the wind-power and solar-power centers rely on renewable, naturally occurring resources to generate electricity, while the hydrogen-power center relies on generation of hydrogen gas to operate, and so in preferred embodiments, the control logic is configured to prioritize electrical generation usage of the solar-power and wind-power centers, and to relegate the hydrogen-power center HFC to a function intended to replace or augment the electrical generation of the solar-power and wind-power centers.

During optimal periods when excess supply capacity from the solar-power and wind-power centers is realized, this surplus energy can be used to power the hydrogen supply center HGC to produce hydrogen from the water supply, from which the produced hydrogen is stored in the ESC for later use by the hydrogen-power center HFC. During the optimal generation ratio periods, the EMP will monitor storage levels at the hydrogen storage $ES-H_2$ of the ESC, as measured by one or more storage sensors connected to the EMP by one or more control lines "c" running between the EMP and ESC. In response to either detection of an inadequate hydrogen reserve under a certain threshold, or detection of any available hydrogen storage capacity as yet unfilled, the EMP activates the hydrogen supply center HGC to produce more hydrogen to increase the stored reserves in the hydrogen storage of the ESC for later use. When operation of the hydrogen power center HFC is needed for electrical generation, the EMP operates appropriate valving to release stored hydrogen from the ESC to the hydrogen-power center through one or more media lines "m" to initiate electrical generation by the hydrogen-power center HFC to fulfill demand power loading.

The EMP's determination of which generation components the system is to use may be based at least partially on the ambient environmental data, where sunny and/or high wind conditions reflect a greater electrical supply capacity from the solar-power and/or wind-power centers, whereas cloudy and/or calm low-wind conditions reflect a reduced electrical supply capacity from the solar-power and/or wind-power centers In addition to facilitating a first energy reserve in the form of compressed hydrogen, some of the electrical power generated by the power centers are used to maintain a charge in the batteries of the electrical storage $ES-Li^+$ at the ESC, thus providing a second energy reserve. The stored hydrogen may be used as a primary reserve of greater energy storage capacity than the smaller battery-based reserve of the electrical storage, for example motivated by lower equipment costs and/or greater energy storage density for hydrogen storage tanks compared to rechargeable lithium ion batteries. Accordingly, the electrical storage $ES-Li^+$ may be dedicated to one or more purposes, for example to provide electrical power to the Black-out/Brown-out restart Center (BRC), which in turn is providing power to the EMP to restart operation of the system after a Black-out/Brown-out event in the power grid. Such restart procedures and the role of the BRC therein is described in greater detail further below.

Figure 2:
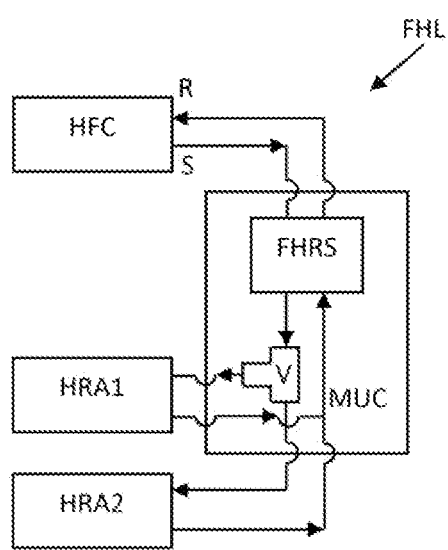
FIG. 2 is a schematic block diagram illustrating a first thermal heating loop of the system of FIG. 1 for transferring waste heat from a hydrogen fuel cell stack to heat-requiring applications elsewhere in the system.

FIG. 2 schematically illustrates a Fuel-cell-heated Heating Loop (FHL), by which the usefulness of the hydrogen-power center HFC is optimized by using waste heat from the fuel cell stack to deliver heat to one or more Heat-Requiring Applications (HRAs) elsewhere in the system. The FHL features media supply and return lines S, R running between the hydrogen-power center HFC and a Mechanical Use Center (MUC), at which there is a Fuel-cell Heat Recovery System (FHRS) with appropriate pumping and heat exchange equipment through which a first flowable heat transfer media is circulated between the hydrogen-power center (HFC) and the FHRS to convey waste heat from the hydrogen fuel cells to the FHRS. From the FHRS, a second flowable heat transfer media that collects the carried waste heat from the first flowable heat transfer media in one or more heat exchangers of the FHRS is circulated to the one or more HRAs to transfer said waste heat thereto. In the illustrated example, there are two HRAs (HRA1, HRA2) served from the FHRS via a three-way valve V to enable control over whether one, both or neither HRA is served with heat transfer media at any given time. However, it will be appreciated that the number of HRAs served by the FHRS and the quantity and type of associated valving used to control selective conveyance of the heat transfer media among these HRAs may vary. One HRA of the FHL may be a mechanical heating application, for example space heating of one or more indoor environments or other enclosed spaces within the system. Another HRA of the FHL may be a need to warm the rechargeable batteries of the electrical storage $ES-Li^+$ to maintain an optimal operating temperature range thereof when the system is used in cold weather climates.

Figure 3:
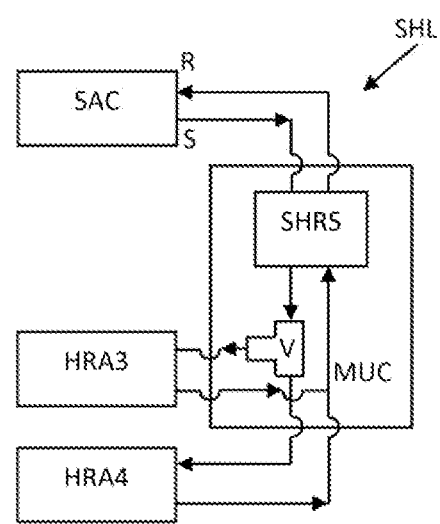
FIG. 3 is a schematic block diagram illustrating a second thermal heating loop of the system of FIG. 1 for transferring collected solar thermal energy from a solar array to additional heat-requiring applications elsewhere in the system.

Similarly, FIG. 3 schematically illustrates a Solar-heated Heating Loop (SHL), by which the usefulness of the solar-power center (SAC) is similarly optimized by using solar thermal energy collected by the solar array to likewise deliver heat to one or more HRAs. The SHL features media supply and return lines S, R running between the solar-power center (SAC) and the same MUC as the FHL, which is therefore referred to as a shared MUC since it hosts fluid routing equipment (pumps, valves, heat exchangers) of multiple heat transfer loops that source fluids from different centers of the system. At this shared MUC, a Solar Heat Recovery System (SHRS) circulates a third flowable heat transfer media between the solar-power center SAC and this SHRS to convey the collected solar thermal energy to the SHRS, through the heat exchanges of which a fourth flowable heat transfer media is circulated between the SHRS and the SHRS-served HRAs to transfer said collected solar thermal energy thereto. In the illustrated example, there are two HRAs (HRA3, HRA4) served from the SHRS via a three-way valve V to enable control over whether one, both or neither HRA is served with heat transfer media. However, it will once again be appreciated that the number of HRAs served by the SHRS and the quantity and type of associated valving used to control selective conveyance of the heat transfer media among the HRAs may vary. One HRA of the SHL may be a mechanical heating application, for example space heating of one or more indoor environments within the system. Another HRA of the SHL may be BRC ambient maintenance. Any of the described heat-requiring applications served by one of the two heating loops may additionally or alternatively be served by the other heating loop. It will also be appreciated that the two heating loops need not necessarily share a common MUC, and instead may each have it's HRS and valving hosed at a different location from those of the other heating loop.

Figure 4:
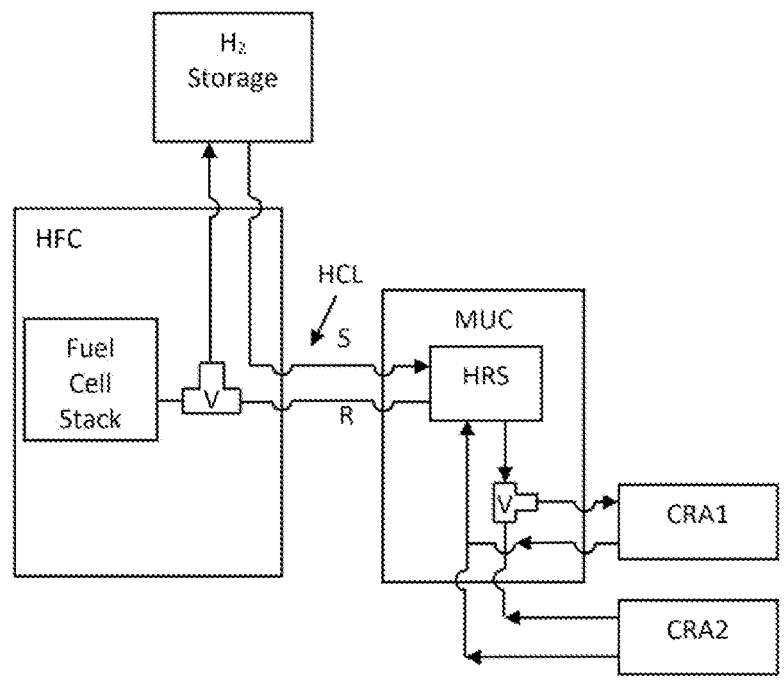
FIG. 4 is a schematic block diagram illustrating a thermal cooling loop of the system of FIG. 1, in which a hydrogen reserve stored for use by the fuel cell stack is circulated for cooling of other components in the system.

FIG. 4 schematically illustrates a Hydrogen-cooled Cooling Loop (HCL), by which usefulness of the hydrogen-power center HFC and associated hydrogen storage ES-$H_2$ is further optimized. The HCL features media supply and return lines S, R running between the hydrogen-power center HFC and the same shared MUC as the FHL and SHL. Here, another Heat Recovery System (HRS) circulates stored hydrogen from the ESC to the HRS of the HCL through the supply line S, during which this circulated hydrogen bypasses the fuel cell stack of the hydrogen-power center HFC, and then circulates the hydrogen back through the return line R, which contains a valve V to control whether the hydrogen is circulated back to the hydrogen storage ES-$H_2$ of the ESC, and/or is supplied to the fuel cell stack HFC for consumption thereby to generate electrical energy. Through another side of the HRS heat exchanger, an additional heat transfer media is circulated in heat exchange relation with the circulated hydrogen and one or more coolant-requiring applications (CRAs), whereby the circulated hydrogen from the ESR serves as a coolant that collects excess heat from such applications. In the illustrated example, there are two CRAs (CRA1, CRA2) served from the HRS of the HCL via a three-way valve V to enable control over whether one, both or neither CRA is served with heat transfer media for cooling purposes. However, it will be appreciated that the number of CRAs served by the HRS of the HCL and the quantity and type of associated valving used to control selective conveyance of the heat transfer media among the CRAs may vary. One CRA of the HCL may be a mechanical cooling application, for example cooling of one or more indoor or enclosed environments within the system. Another CRA of the HCL may be cooling of electrical conductors, whether at the EDC or anywhere else in the system. The HCL and one or both of the FHL and SHL may be used for cooling and heating of an environmentally controlled indoor or enclosure space containing the hydrogen tank(s) of the ESC.

While FIG. 4 illustrates a cooling loop routed through the hydrogen-power center HFC and shared MUC, FIG. 1 additionally illustrates a direct cooling loop DCL for circulating hydrogen directly to and from the EDC for conductor cooling purposes, for example at one, both or between the DDC and DCC. Accordingly, hydrogen may be used as a direct or indirect coolant, and may or may not share a common MUC with other heat transfer loops, whether those other heat transfer loops are for cooling and/or heating purposes.

The operational environment sensors connected to the EMP therefore include temperature sensors for monitoring conditions at the heat-requiring and coolant-requiring applications, and the valving in the heating and cooling loops are also connected to the EMP for automated control thereby to control circulation of the heat transfer media in these heating and cooling loops according to monitored heating and cooling needs at the various heat-requiring and coolant-requiring applications.

Figure 5A:
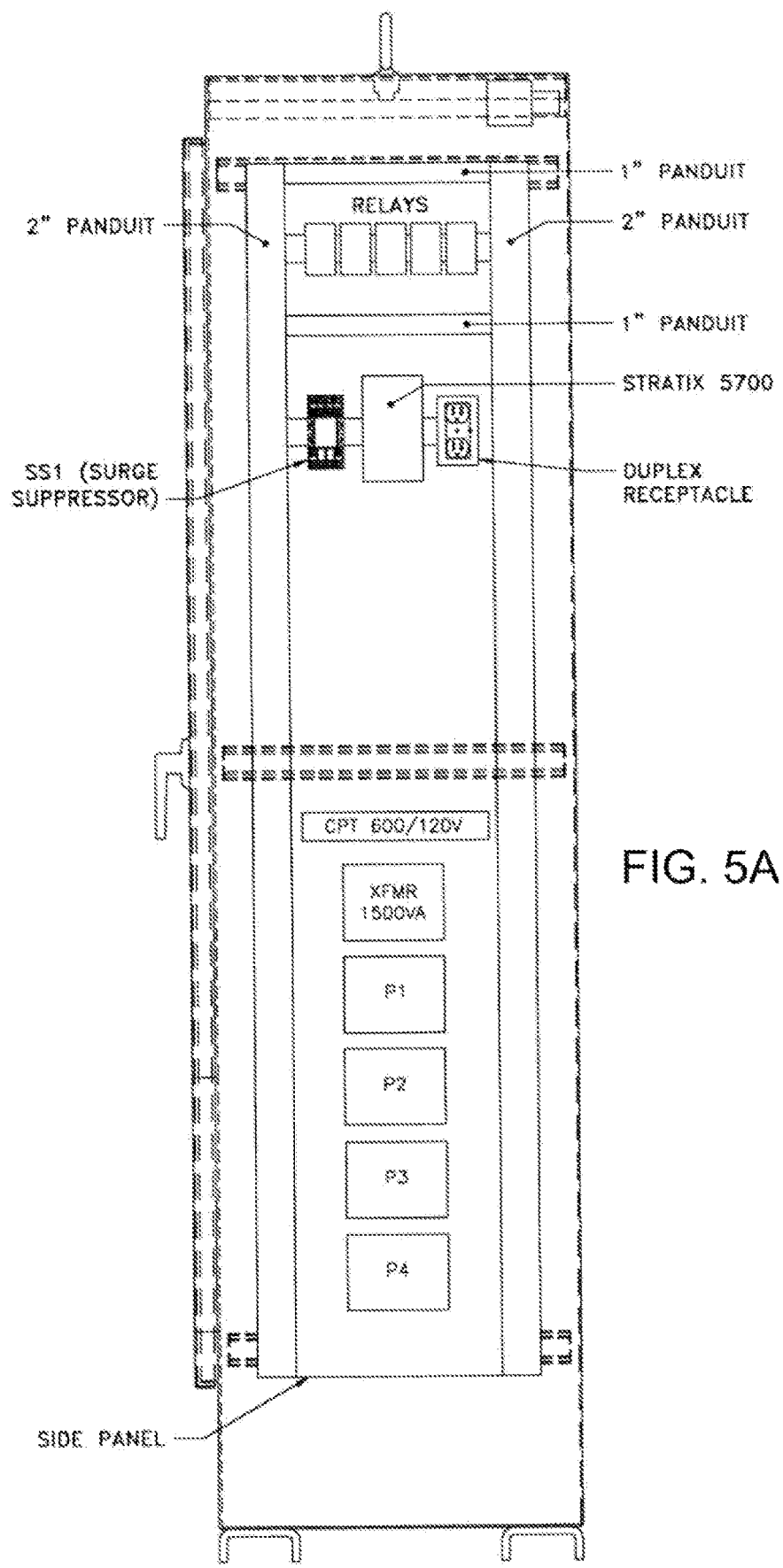
FIG. 5A is a left-side elevational view of an energy management panel responsible for control of the system.
Figure 5B:
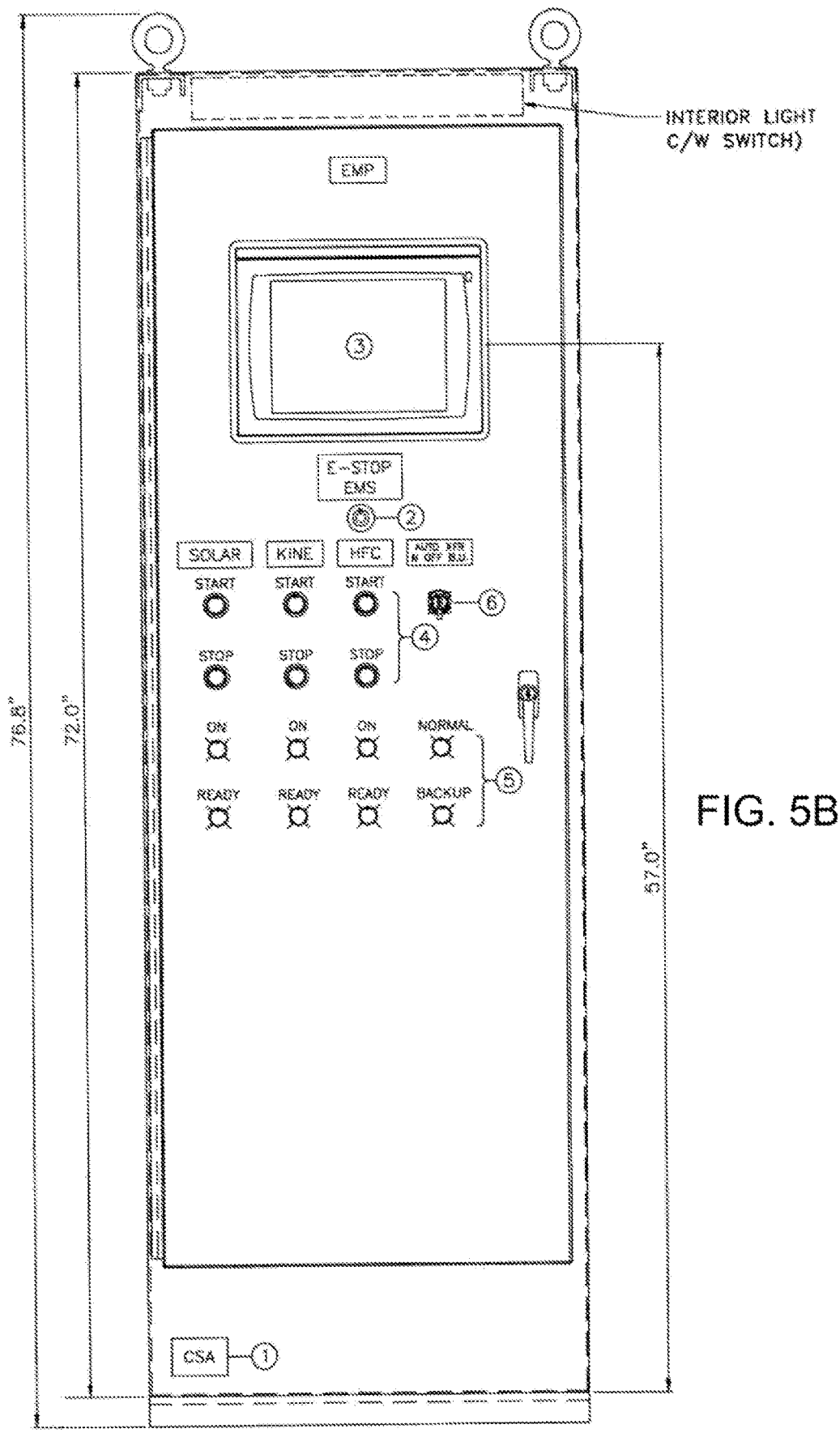
FIG. 5B is a front elevational view of the energy management panel of FIG. 5A.
Figure 5C:
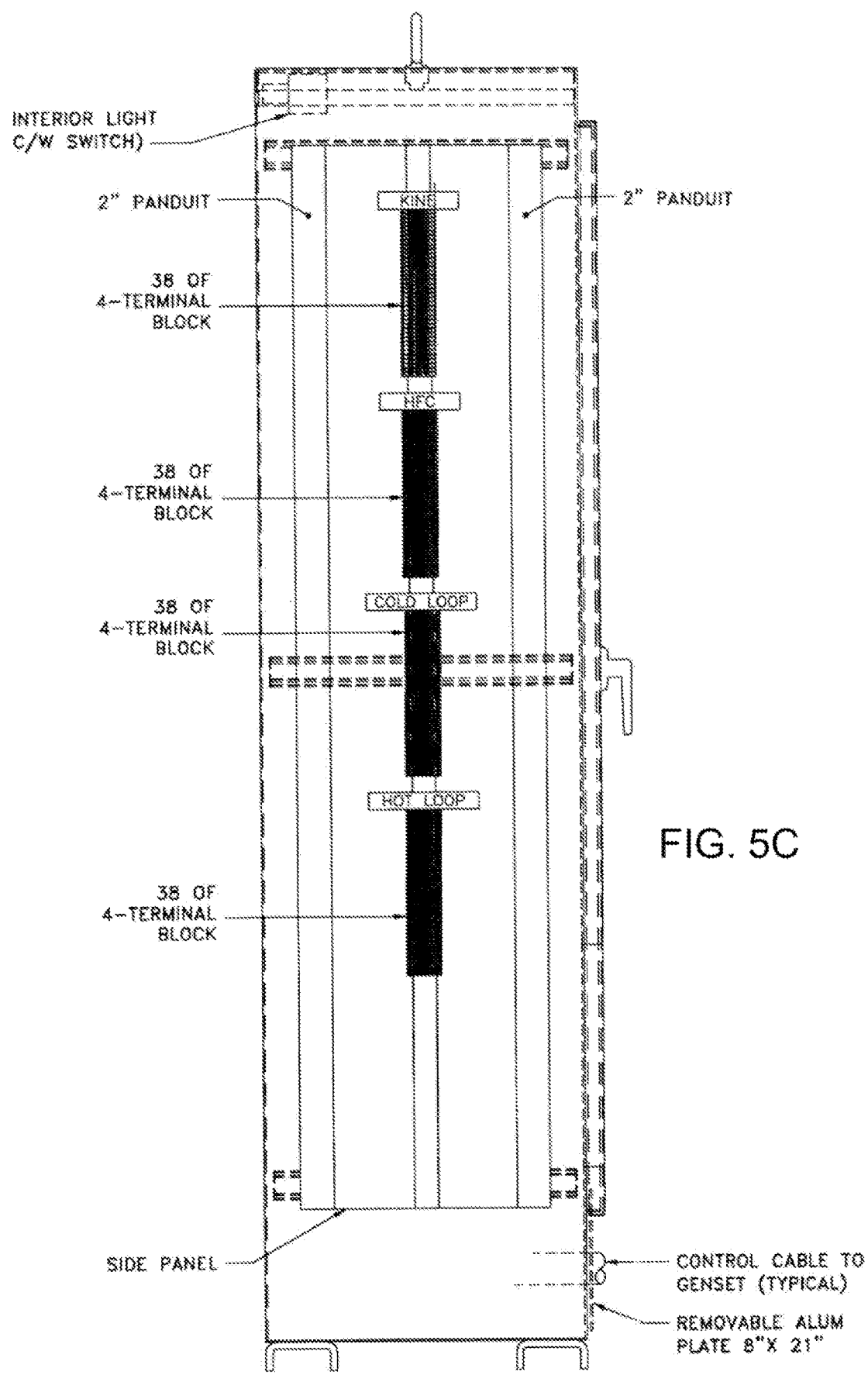
FIG. 5C is a right-side elevational view of the energy management panel of FIG. 5A.
Figure 5D:
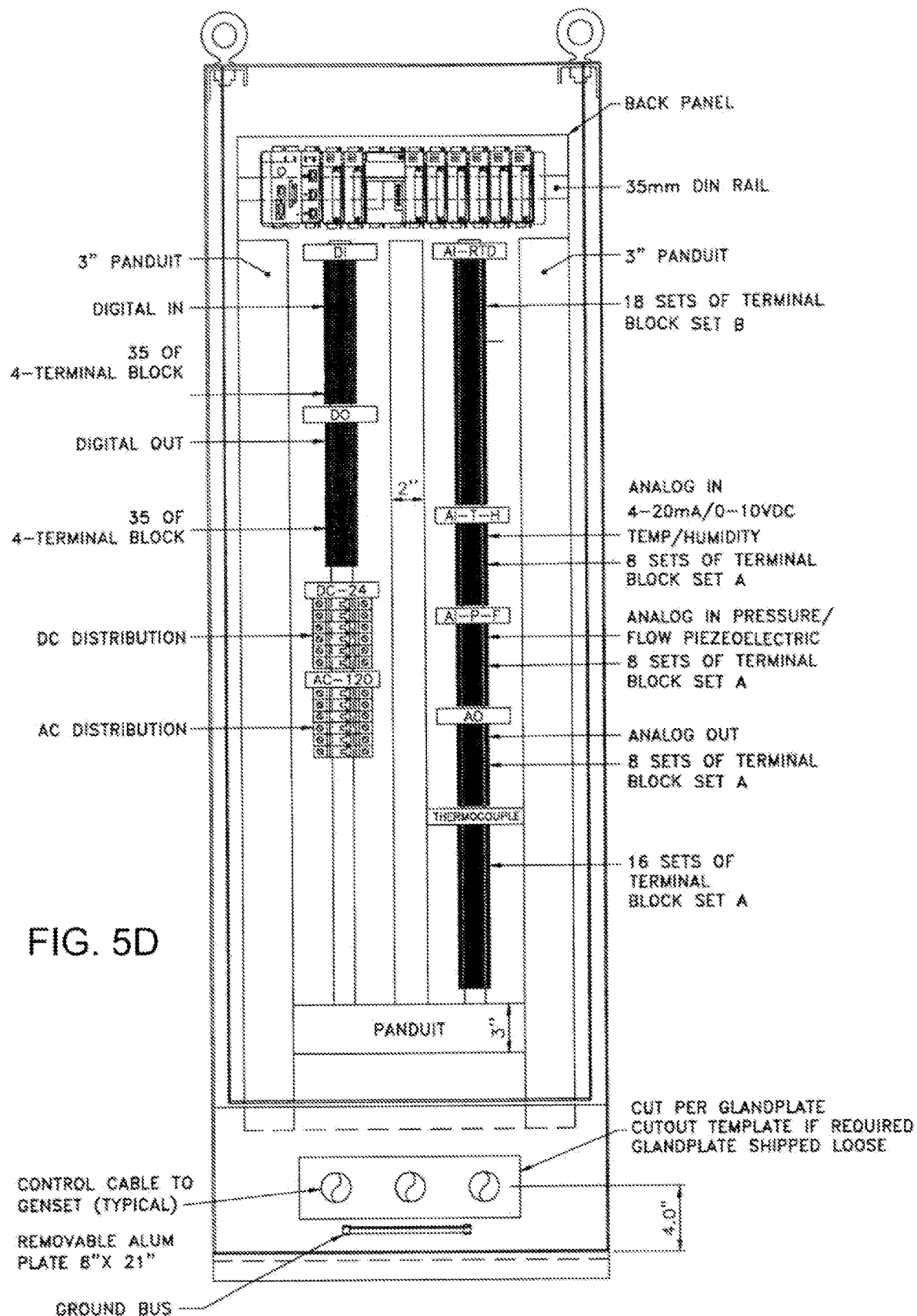
FIG. 5D is another front elevational view of the energy management panel of FIG. 5A, but with a housing door thereof removed to reveal internal components thereof.

FIGS. 5A through 5D show an EMP according to one preferred embodiment. With reference to FIG. 5B, a Human Machine Interface (HMI) on the front side of the panel housing features a touch display screen, an emergency stop button to deactivate the entire system is there, individual stop and start switches for each power center, and operational indicators to reflect operational status of each power center. Inside the housing, the panel features terminal blocks for connection of pressure and/or flow sensors for the heating and cooling loops; one or more sensors for monitoring the levels of the hydrogen storage tanks; temperature sensors for the heating and cooling applications; sunlight and wind sensors for measuring sunlight levels, wind speed and wind direction; valving used to control flow through the media flow lines; and connections of the control lines to the ESC, BRC, power centers HFC, SAC and WTA.

Attention is now turned to the aforementioned restart procedure triggered in the event of detected outage conditions. Detection of such outages and the actions taken in response thereto are cooperatively achieved by the EMP and the separate BRC. By attributing certain restart actions to the dedicated BRC rather than to the same EMP that is responsible for normal system-wide control during regular non-outage conditions, the BRC protectively isolates the EMP from potential damage caused by outage conditions.

As mentioned above, the EMP is communicably connected to a power monitor PM of the EDC that is operable to monitor output power characteristics from the DCC. Here, between the DCC and ADC, the EMP is also connected via switchgear (SG) that, in a known manner, employs protective breakers and relays to isolate and protect the system and feeders in the event of downstream faults in the power grid. In addition to the EDC switchgear between the DCC and ADC, the EMP is also connected to Auto Reclosers (ARCs) on the connected power grid distribution lines outside the EDC downstream of the distribution transformers. Accordingly, the EMP can use the detected status of the switchgear and ARCs to recognize the occurrence of outages on both the feeders and distribution lines, and take appropriate actions depending on the type of event detected.

The BRC comprises of a computerized controller, which will be a microcontroller of scaled down size and functionality compared to the more complex normal operation programmable logic controller of the EMP due to the lesser scope of the BRC's dedicated tasks relative to the EMP's system-wide control responsibilities. The controller of the BRC is communicably connected to each of the power centers HFC, SAC, WTA and operable to perform diagnostics on the operational state thereof. The BRC also contains auto transfer switches installed in the electrical circuits responsible for powering of electrical components in the various centers of the system (i.e. the system's internal loads), whereby the BRC can use these transfer switches to enabling switching of the internal loads between a "normal power" mode, in which the internal loads are powered in a normal fashion from the EDC via the local station transformer thereof, and an "emergency power" mode, in which the internal loads or a subset thereof are powered in a backup fashion from one or more of the power centers HFC, SAC, WTA and/or the electrical storage ES-$Li^+$ of the ESC.

So in the event of a feeder or distribution line fault, opening of the ARC's is detected by the EMP, and the ARCs attempt automatic reclosure a predetermined number of times. If the fault has not cleared after such repeated reclosures, the EMP will notify authorized personnel (e.g. utility worker) through a communications network connection of the EMP, so that the cause of the fault can be investigated, and corrected. Such notification may be performed via telephonic auto-dialer, SMS message, email, or other communication means. The EMP will operate in a reduced functionality emergency mode of reduced operation until it receives a restart notice once the fault has been cleared. Such restart notice may be remotely transmitted to the EMP over the communications network, or manually inputted at the interface of the EMP by on-site or visiting personnel.

In the aforementioned event of a partial distribution outage on the feeders to the external loads, as confirmed by the EMP's detection of one or more open breakers at the switchgear, the EMP sends a signal through the protection and control relay(s) to reclose the breaker(s) to re-establish power to the external load(s) again if and only if the owner operator has confirmed the fault is cleared.

In any such events, should the EMP also detect opening of a protective breaker of the local station transformer through which the internal loads of the system are normally powered, then the emergency functionality of the BRC is initiated by the EMP's communicable connection thereto, in response to which the BRC can switch one or more of the auto transfer switches from the normal power mode to the emergency power mode. The EMP, due to an electrical connection thereof to the electrical storage of the EDC through the BRC, has a continuous, uninterrupted power supply to enable it to report the detected outage events to the BRC in any event.

The BRC's selection of which auto transfer switches to actuate is subject to checking the diagnostic status of the different power centers to determine which are still operating normally to generate electricity despite the outage event that has triggered the emergency procedure. Those power centers confirmed to be operating normally can then be tapped for electrical power by changing operating position of the respective auto transfer switch to direct power from the operating power center to one or internal loads through the BRC, rather than through the EDC and the local station transformer thereof. If none of the power centers have a positive operational diagnosis, or if the power garnered from the positively diagnosed power center(s) is insufficient for BRC-recognized system needs, the BRC can also draw stored electrical power from the ESC.

The BRC controller is programmed to prioritize critical internal loads over others, and prioritize low-power internal loads over more energy intensive ones. In FIG. 1, the sole electrical input to the EMP is fed from the BRC in any state, and so the BRC determines whether the EMP receives emergency power during these emergency events, and where such power is sourced. Highest power priority in these emergency events may be given to those intended to protect the system and/or personnel, for example internal protection and controls circuitry, HVAC equipment, fire suppression, etc. Accordingly, available power from the EDC reserves and any properly operating power centers may be prioritized to such protective componentry over the EMP, whose operation may not be essential until the outage source has been rectified so that normal system operation can be reinstated. The BRC includes a redundant connection to the communications network to enable notification of personnel through the communications network regardless of the EMP's current operational state.

If the BRC determines sufficient power is available to the EDC from the ESC plus operationally sound power centers, it will restart the EMP, which in turn can then initiate full system operations, in a logically staggered fashion attempting to reconnect different loads individually with consideration of load prioritization. The EMP starts by reclosing the main breaker of the switchgear, checks the readings from the power meter to confirm appropriate power characteristics before closing any subsequent breakers downstream on the main electrical power switch gear bus. If such power readings are within acceptable parameters, then the protective breaker of the local station transformer is closed. If detected power conditions are again confirmed as appropriate, then the EMP informs the BRC that the local station transformer is again operable, in response to which the BRC switches its auto transfer switches back to the normal power mode (in a make before break fashion to avoid power interruption) so that the internal system loads can once again draw power from the EDC in normal fashion. The EMP can then continue the staggered restart procedure by similarly re-closing the breakers through which the distribution feeders are supplied with power for their respective external loads. If the closing and testing procedure is successful for all loads, this marks the end of the restart procedure, upon which the EMP can re-initiate normal operating routines. If the restart procedure cannot be fully completed, the EMP sends out a personnel notification so that on-site inspection and appropriate corrective action can be taken.

If the BRC diagnostics performed on the various power centers revealed irregularities at one or more of the power centers that suggest said one or more centers may have incurred damage, then this diagnostic output is taken into consideration when returning to the EMP to its normal system-control mode after having completed the staggered restart procedure. That is, when the BRC instructs the EMP to initiate the restart procedure, it can include signals reflective of an "operational" or "non-operational" status of each power center, so that when the EMP returns to the normal system control mode after completion of the restart procedure, it executes operational control algorithms of only those power centers that were reported as properly "operational" by the EMP, and omits the operational control of any power center reported as "non-operational". Instead of sending the diagnostic results from the BRC to the EMP as part of the restart command, the EMP instead may request the diagnostic results from the BRC only if the successful completion of the restart procedure is achieved.

Through these outage detection, emergency operation and restart procedures, the BRC and EMP cooperatively provide the overall system with an autonomous restart capability in the event of various black-out/brown-out conditions that may arise, and with an autonomous personnel notification capability should a successful restart not be achieved in any given circumstance.

Figure 6:
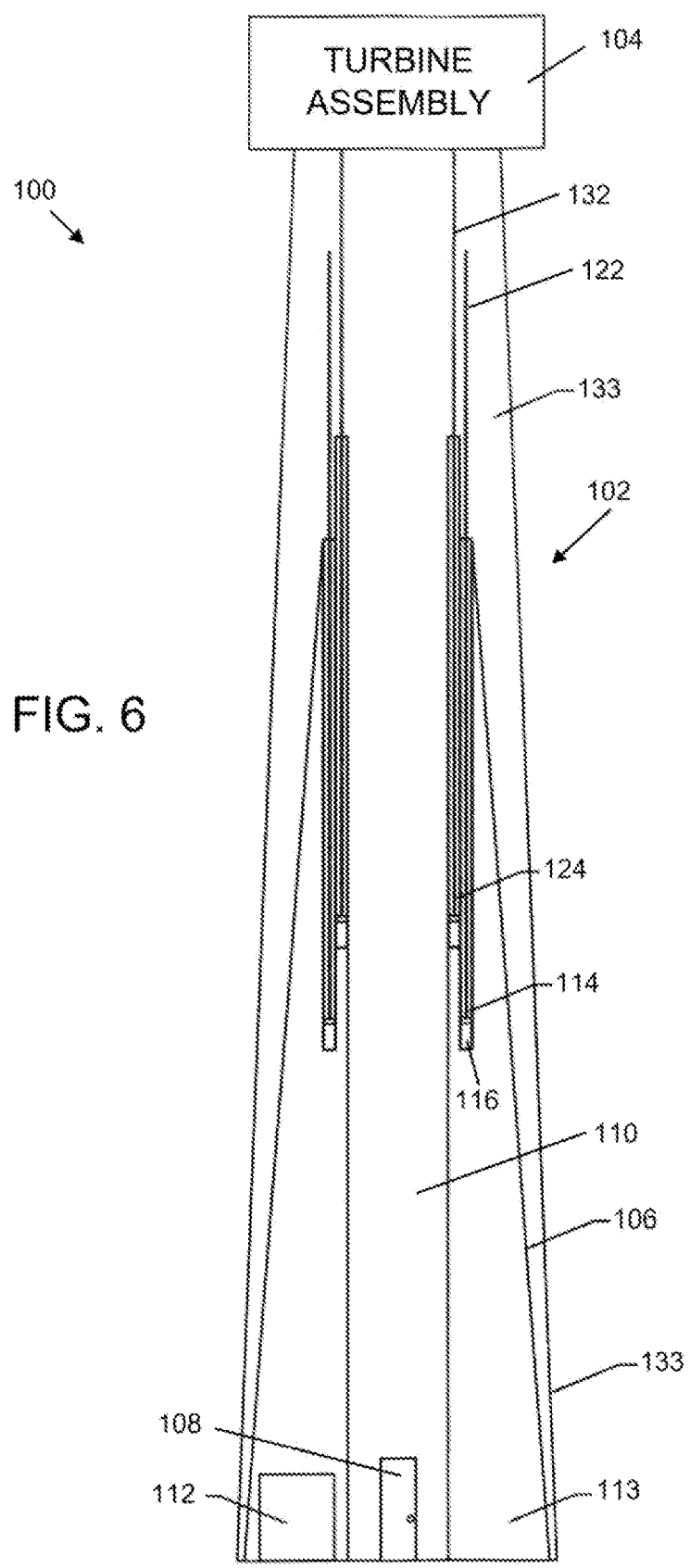
FIG. 6 is a schematic elevational view, cross-sectioned in a central vertical plane, of an elevationally self-optimizing wind turbine used in a wind-power center of the system.

In addition to the above described optimization of the hydrogen-power and solar-power centers HFC, SAC by advantageously exploiting available thermal energy therefrom, the present invention also includes novel optimization of each wind turbine in the wind-power center WTA. In additional to known techniques for optimizing various characteristics of the wind turbine according to detected air speed and wind direction, the inventive wind turbine of the present invention includes means for self-adjusting the elevation at which the rotor of the wind turbine resides according to measured variability of air stream conditions at different elevations. Referring to FIG. 6, the wind turbine 100 features a telescopically adjustable tower 102 atop which the turbine assembly 104 is mounted, whereby the degree of telescopic expansion/collapse of the tower 102 determines the particular elevation at which the rotor of the turbine assembly 104 resides. For illustrative simplicity, the turbine assembly 104 is shown only schematically, without detail.

The illustrated embodiment employs a hydraulic solution for the telescopic expansion of the height-adjustable tower, though other embodiments may employ alternative means for controlling increase and decrease of the tower height. A static first base section 106 of the tower resides at ground level, and contains both a reservoir for storing the hydraulic fluid, and the necessary pumping equipment for distributing the hydraulic fluid through the system according to the required raising and lowering of one or more movable sections of the tower relative to the static base section 106 on which they are supported. FIG. 6 shows a schematic representation of the wind turbine, where the static base section 106 has a personnel access door 108 by which a central access shaft 110 of the tower is accessible, and a pump room 112 for housing the pumping equipment. An annular space of the static base section pans circumferentially around the access shaft 110, and serves as the hydraulic fluid reservoir 113 in the non-limiting example of the illustrated embodiment.

Figure 7:
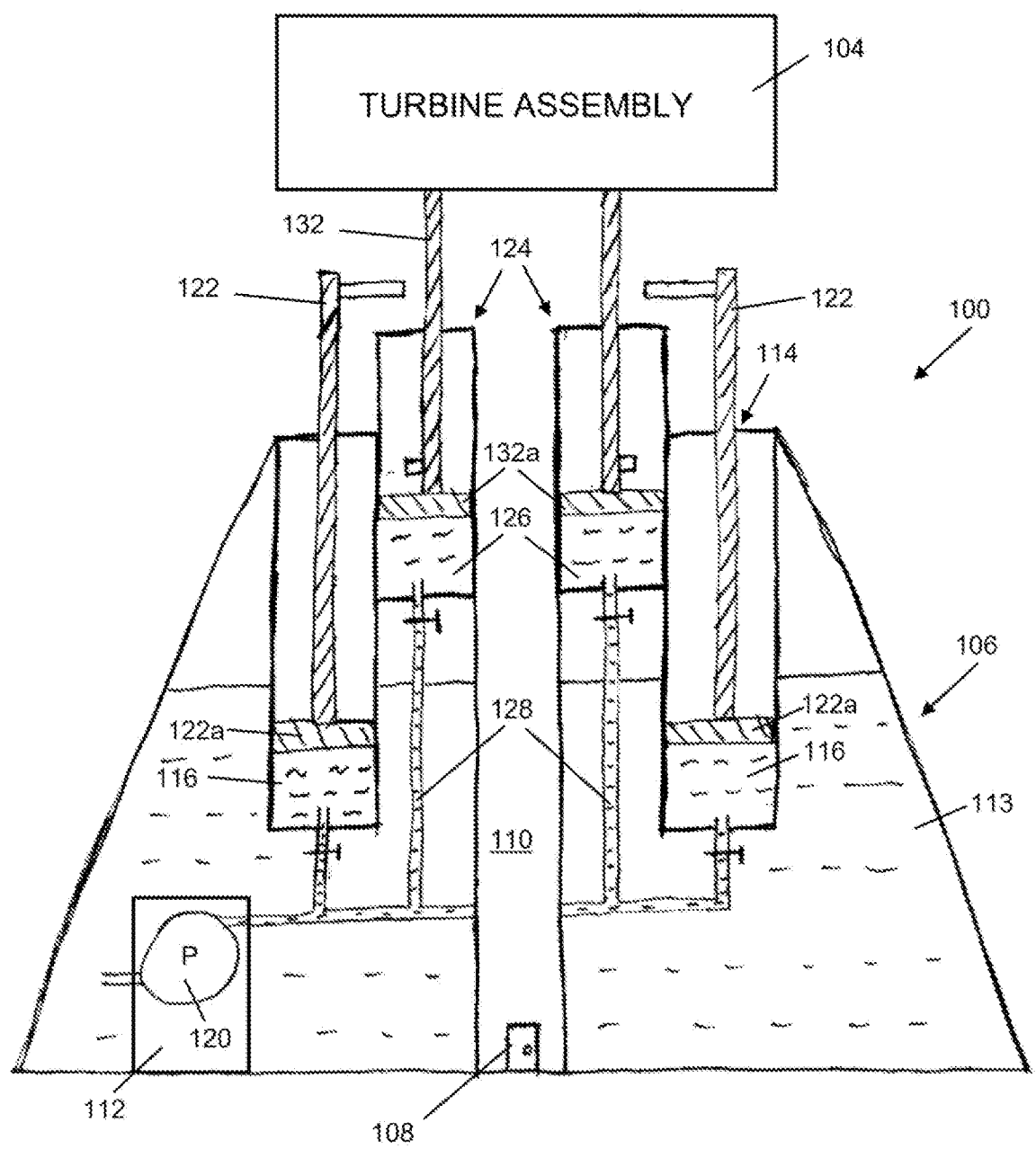
FIG. 7 is a more detailed schematic elevational view of the wind turbine of FIG. 6, once again cross-sectioned in the central vertical plane thereof.

A height-adjustable second section 114 of the tower features a first annular chamber 116 spanning around the access shaft 110 at a fixed elevation within the static base section 106. Referring to FIG. 7, one or more hydraulic lines 118 feed into this first annular chamber 116 from a pump 120 installed in the pump room 112 of the static base section 106 to draw from the hydraulic reservoir 113 thereof. A first hollow column 122 has a lower end 122a telescopically received in the first annular chamber 116 to enable the first column 122 to ride up and down in the first annular chamber atop the hydraulic fluid pumped thereinto. The column 122 has a greater axial height than the chamber 116 so that an upper portion of the column 122 stands upwardly from the top end of the chamber 116. Pumping of the hydraulic fluid into the first annular camber 116 thus lifts the first hollow column 122 to increase the height by which it stands upright from the first annular chamber, thus increasing the overall axial height of the height adjustable first section 114 of the tower.

The illustrated embodiment is a dual-stage height-adjustable tower that additionally features a height-adjustable third section 124, but it will be appreciated that a single-stage height-adjustable tower having only one height-adjustable section mounted on the static base section 106 is also within the scope of the present invention, in which case the turbine assembly 104 would be mounted atop the movable column 122 of the height-adjustable second section 114 to enable upward and downward movement of the turbine assembly 104 through hydraulic lifting and gravitational lowering of the first movable column 122.

Returning to the illustrated dual-stage embodiment, a height-adjustable third section 124 of the tower features an additional annular chamber 126 spanning around the access shaft 110 of the tower 102 and affixed to the upper portion of the first column 122 that resides externally above the first annular chamber 116 even when the first column 122 is in its fully lowered position seated at the bottom of the first annular chamber. As shown in FIG. 7, one or more hydraulic lines 128 feed into this second annular chamber 126 from the pump 120. A second hollow column 132 has a lower end 132a telescopically received in the second annular chamber 126 to enable the second column 132 to ride up and down in the second annular chamber atop the hydraulic fluid pumped thereinto. The second column 132 has a greater axial height than the second annular chamber 126 so that an upper portion of the second column 132 stands upwardly from the top end of the second chamber 126. Pumping of the hydraulic fluid into the second annular chamber 126 thus lifts the second hollow column 132, increasing the overall axial height of the height adjustable third section of the tower. Since the second annular chamber 126 is carried by the movable column 122 of the second section 114, hydraulic lifting of the second column 132 in the second chamber 126 further increases the height of the tower 102, thereby further elevating the turbine assembly 104 that is mounted atop the second column 132 in the illustrated two-stage embodiment.

It will be appreciated multi-stage height-adjustable towers of more than two height-adjustable sections are also within the scope of the present invention. In the example shown in FIG. 6, an insulated flexible shell 133 circumferentially surrounds all three sections 106, 114, 124 of the height-adjustable tower 102, and spans the variable axial height of the tower 102 from the base section 106 up to the turbine assembly 104 carried atop the third section 124. Means for spring recoil of aircraft cable guides for this outer shell may be contained in outer circumferential areas of the tower's base section.

Figure 8:
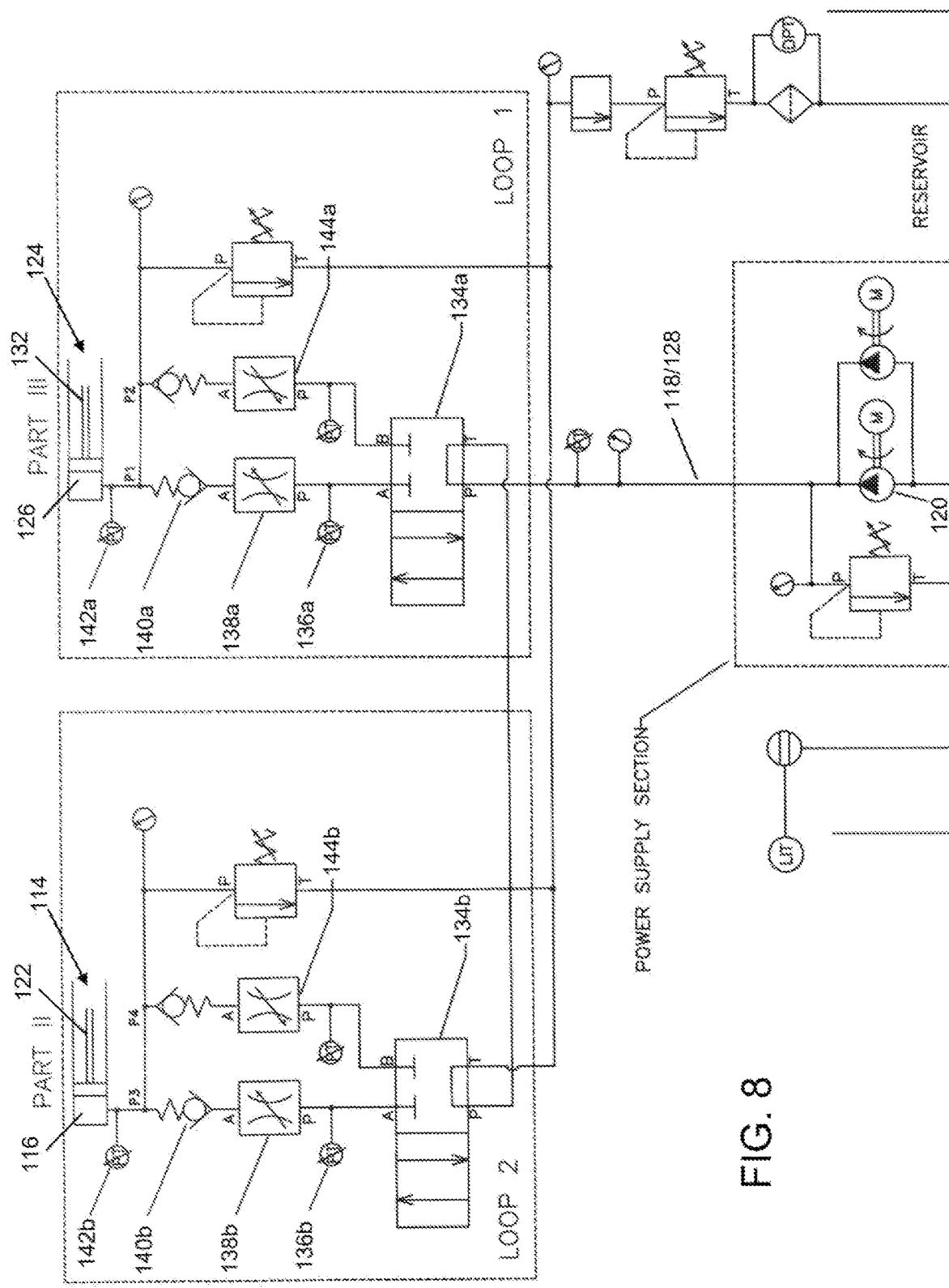
FIG. 8 is a schematic diagram of a hydraulic control system for telescopic height adjustment of a tower structure of the wind turbine of FIGS. 6 and 7.

FIG. 8 schematically illustrates one exemplary hydraulic control system for performing height adjustment of the wind turbine tower by selective raising and lowering the movable columns thereof. With reference thereto, description is now made of the process of lifting of the turbine assembly from a lowermost point of its elevation adjustable range, at which the annular chambers of the height-adjustable second and third tower sections are both fully evacuated of hydraulic fluid so that the movable columns reside at their lowermost points seated at the bottom of their respective annular chambers.

First, the pump 120 is activated to pump hydraulic fluid into the supply lines 118, 128 of the adjustable second and third tower section 114, 124, both of which are normally closed by respective directional control valves 134a, 134b. The directional control valve 134a in the supply line 128 of the third section 124 is opened first, and a respective pressure transmitter 136a upstream of the directional control valve 134a is monitored by a connected controller, which for example may be that of the EMP, until a sufficient pressure for lifting the third section 124 and attached turbine assembly 104 is built up. At such time, a respective flow control valve 138a upstream of the pressure transmitter 136a is opened to admit hydraulic fluid into the annular chamber 126 of the third section 124 through a check valve 140a, and a mechanical safety lock (not shown) normally engaged between the annular chamber 126 and movable column 132 of the third section 124 is disengaged to enable telescopic movement therebetween. The movable column 132 of the third section 124, atop which the turbine assembly 104 is mounted, is thereby lifted by the pressurized hydraulic fluid admitted to the third section's annular chamber 126.

The EMP or other controller connected to the pump, valving and pressure transmitters of the wind turbine's hydraulic control system selects the targeted elevation for the wind turbine assembly based on which monitored elevation within the adjustable elevational range of the wind turbine has a maximum detected airstream speed. This may be based on elevational air stream data from an external source (e.g. external weather service), or based on a dedicated air stream sensor array of the system. In one embodiment, for example, this sensor array comprises a series of air speed sensors mounted at discrete elevations on a simple tower whose overall height is comparable that of the maximum height of the height-adjustable wind turbine, i.e. equal to or greater than the maximum height from the ground to the axis of the wind turbine rotor at the maximum achievable elevation thereof.

Turning back to the turbine elevating process, once either the targeted elevation of the turbine assembly 104 is reached, or the third section 124 has reached its maximum height of extension, directional control valve 134a and flow control valve 138a are closed, and the third section's mechanical safety lock is re-engaged to ensure that the third section 124 is held at the achieved degree of height extension even in the event of hydraulic pressure loss. With the third section hydraulically locked by closure of the directional valve 134*a*, and redundantly locked by the mechanical safety lock, the pump 120 may be shut down. An operational pressure transmitter 142*a* monitors for such pressure loss in the annular chamber 126, which if detected, bars any disengagement of the mechanical lock by the controller for safety purposes.

If the targeted elevation is beyond that achievable by extension of only the third section 124, then the second section 114 must also be extended. To achieve this, the pump 120 is restarted (if previously shut down), and the respective directional control valve 134*b* of the second section 114 is opened. The respective pressure transmitter 136*b* upstream of directional control valve 134*b* is monitored by the connected controller, until a sufficient pressure for lifting the second and third sections 114, 124 and attached turbine assembly 104 is built up. At such time, the respective flow control valve 138*b* upstream of the pressure transmitter 136*b* is opened to admit hydraulic fluid into the annular chamber 116 of the second tower section 114 through a check valve 140*b*, and another mechanical safety lock (not shown) normally engaged between the annular chamber 116 and movable column 122 of the second tower section 114 is disengaged to enable telescopic movement therebetween. The movable column 122 of the second section 114, on which the third section 124 and turbine assembly 104 are carried, is thereby lifted by the pressurized hydraulic fluid admitted to the second section's annular chamber 116. Once the targeted elevation of the turbine assembly 104 is reached, directional control valve 134*b* and flow control valve 138*b* are closed, the second section's mechanical safety lock is re-engaged to ensure that the second section is held at the achieved degree of extension even in the event of hydraulic pressure loss, and the pump 120 may be shut down. Again, an operational pressure transmitter 142*b* monitors for such pressure loss in the annular chamber 116, which if detected, bars any disengagement of the second section's mechanical lock by the controller for safety purposes.

If the second section is not at full extension, and a change in airstream conditions warrants further extension to achieve a greater elevation of the turbine rotor, such further extension may be performed by reactivating the pump (if previously shut down), re-opening the directional control valve 134*b*, building up sufficient lifting pressure confirmed by pressure transmitter 136*b*, and re-opening flow control valve 138*b* to admit more fluid into the annular chamber 116 of the second section 114 to once again lift the movable column 132 of the second section 114, and thereby raise the turbine assembly 104 carried thereatop.

Should a change in airstream conditions warrant collapse of one or both adjustable tower sections 114, 124 to achieve a lower elevation of the turbine assembly 104, then a collapse procedure is initiated, starting with collapse of the second section 114, followed by collapse of the third section 124 if necessary to achieve the targeted lower elevation. First, to allow hydraulic fluid to drain back to the reservoir through the same supply line from which is was originally sourced, directional control valve 134*b* of the second section 114 is opened, followed by release of the second section's mechanical safety lock and controlled opening of a return flow control valve 144*b* in a drain line that runs from the second section's annular chamber 116 back to a return port on the second section's directional control valve 134*b*. This allows the hydraulic fluid to gravitationally drain from the second section's annular chamber 116 back to the reservoir 113 in the base section 106, thus allowing the second section's movable column 122 to fall in a controlled manner by constrained flow of the draining hydraulic fluid through the return flow control valve 144*b*. If full collapse of the second section 114 is not desired based on the targeted elevation of this turbine-lowering procedure, then the second section's directional control valve 134*b* and return flow control valve 144*b* are re-closed, and the second section's mechanical safety lock is re-engaged, once the targeted elevation is reached at a partially collapsed state of the second section 114.

Should the targeted elevation be lower than that achieved by full collapse of the second section 114, then the third section 124 is also collapsed following the same procedure of its identical hydraulic circuit, where directional control valve 134*a* is opened, followed by release of the third section's mechanical safety lock and controlled opening of the return flow control valve 144*a* in the drain line that runs to the return port on the third section's directional control valve 134*a*, thus allowing the hydraulic fluid from the third section 124 to gravitationally drain back to the reservoir 113 of the base section 106 in a controlled manner allowing the third section's movable column 132 to likewise descend in a controlled fashion. If full collapse of the third section 124 is not desired based on the targeted elevation of this turbine-lowering procedure, then the third section's directional control valve 134*a* and return flow control valve 144*a* are re-closed, and the third section's mechanical safety lock is re-engaged, once the targeted elevation is reached at a partially collapsed state of the third section.

The turbine assembly 104 may include a mechanism operable to statically lock the rotor in a motionless state about its axis of rotation during adjustment of the tower elevation, thereby reducing the potential for instability caused by large moment loads exerted on the tower by the angular momentum of the moving rotor blades. However, such rotor locking functionality may be unnecessary in embodiments with sufficient constraints between the relatively movable sections of the height adjustable tower.

The term "center" is used herein in a general sense to identify different subsystems or modules within the overall system architecture, and is not used to necessarily denote that all the subcomponents of that "center" must all reside at a shared location. For example, the solar panels in the solar array of the solar-power center need not necessarily be clustered together at a singular shared location, just as the turbines of the wind turbine array may be distributed at various locations interspersed by other components of the overall system. Likewise, the hydrogen-power center may comprise multiple HFC stacks at different locations, the hydrogen storage $ES-H_2$ may comprise storage tanks or vessels at different locations, and the electrical storage $ES-Li^+$ may comprise multiple batteries at different locations.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A system for generating, storing and managing energy, said system comprising:
    a solar-power center comprising a solar array operable to generate electricity from solar energy;
    a wind-power center comprising at least one wind turbine operable to generate electricity from wind energy;
    a hydrogen-power center comprising hydrogen fuel cells operable to generate electricity from a supply of hydrogen;

a hydrogen supply center operable to produce hydrogen; and an energy storage center comprising:
hydrogen storage fluidly connected between the hydrogen supply center and the hydrogen power center to store hydrogen produced by the hydrogen supply center for subsequent use by the hydrogen-power center; and
electrical storage comprising one or more rechargeable batteries for storing electricity generated by one or more of the solar, wind and hydrogen centers;

a shared electrical distribution center electrically connected to each of the solar-power, wind-power and hydrogen-power centers to distribute the electricity generated thereby to both internal loads and external loads, of which said external loads are fed by distribution feeders and said internal loads are connected to auto transfer switches that are switchable between normal modes powering said internal loads from said shared electrical distribution center, and emergency modes powering said internal loads from one or more of the supply centers and/or the electrical storage of the energy storage center;

a computerized energy management subsystem comprising a first controller that is electrically connected to the energy storage center to monitor energy reserves thereat, is electronically connected to a power monitor of the shared electrical distribution center to monitor power conditions thereat, and said computerized energy management system being configured to:
manage the different centers based at least partly on said monitored energy reserves and said power conditions;
detect power outage conditions interrupting a supply of power from the electrical distribution center to said internal loads of the system;
prioritize primary electrical generation by the solar-power and wind-power centers, and relegate the hydrogen-power center to a secondary role replacing or augmenting the primary electrical generation of the by the solar-power and wind-power centers;
detect optimal periods when excess supply capacity from the solar-power and wind-power centers is available, and based on detected levels of the monitored energy reserves during such optimal periods, assess whether a reserve level of the hydrogen storage indicates either an inadequate reserve or unfilled capacity, and activate the hydrogen-supply center in response to detection of said inadequate reserve or unfilled capacity;

a black-out/brown-out restart center (BRC) comprising a second controller that:
is powered from the electrical storage of the energy storage center;
is separate from the first controller of the energy management subsystem;
is configured to receive indication from the first controller of the detected power outage conditions, and in response thereto, initiate an emergency procedure that comprises:
diagnosing operating statuses of said solar-power, wind-power and hydrogen-power centers;
based on said operating statuses, assessing available emergency power;
from among said computerized energy management subsystem and said internal loads, and based on the available emergency power assessed, identifying one or more high priority components to operate with said available emergency power and one or more low priority components to deactivate, among which the computerized energy management subsystem is attributed a lower priority than some of said internal loads;
for any of said one or more high priority components powered via one or more of the auto transfer switches, switching said one or more of the auto transfer switches into the emergency mode;
either powering or deactivating the computerized energy management subsystem based on identification thereof as either one of said high priority or lower priority components.

2. The system of claim 1 wherein the BRC is further configured to, after deactivating the computerized energy management subsystem, reassessing said available emergency power, and based thereon, reactivating the computerized energy management subsystem, which is configured to perform a staggered restart procedure in response to reactivation by the BRC.

3. The system of claim 2 wherein the BRC is further configured to, when reactivating the computerized energy management subsystem to initiate the staggered restart procedure performed thereby, send a signal of a non-operational status to the computerized energy management subsystem for any negatively diagnosed power center, in response to which the computerized energy management subsystem omits said negatively diagnosed power center from normal operating procedures of the computerized energy management subsystem once reinstituted after said staggered restart procedure.

4. The system of claim 1 wherein the computerized energy management subsystem is configured to receive data on wind and solar conditions, and to employ said data in management of the different centers.

5. The system of claim 1 wherein the computerized energy management system is configured to prioritize electrical energy generation by the wind-power and solar-power centers over the hydrogen-power center.

6. The system of claim 1 comprising at least one heating loop that runs between one of the power centers and one or more heat-requiring applications, and is operable to collect and transfer thermal energy from said one the power centers to said to one or more heat-requiring applications.

7. The system of claim 6 wherein said at least one heating loop comprises a fuel-cell-heated loop that runs between the hydrogen-power center and said one or more heat-requiring applications to transfer waste heat from the hydrogen fuel cells to said one or more heat-requiring applications.

8. The system of claim 6 wherein said at least one heating loop comprises a solar-heated heating loop that runs between the solar-power center and one or more heat-requiring applications to transfer collected solar thermal energy thereto.

9. The system of claim 6 wherein the one or more-heat requiring applications comprises heating of at least one the rechargeable batteries in a cold environment.

10. The system of claim 6 wherein said one or more-heat requiring applications comprises at least one mechanical heating application.

11. The system of claim 1 comprising at least one cooling loop that runs between the hydrogen storage and one or more coolant-requiring applications and is operable to transfer excess heat from said coolant-requiring application(s) to circulated hydrogen from said hydrogen storage.

12. The system of claim 11 wherein said one or more coolant-requiring applications comprises electrical conductor cooling.

13. The system of claim 12 wherein said cooling loop runs between the hydrogen storage and the shared electrical distribution center for electrical conductor cooling thereat.

14. The system of claim 11 wherein said one or more coolant-requiring applications comprises mechanical equipment cooling.

15. The system of claim 1 wherein a plurality of heating and/or cooling loops run through a shared mechanical center at which pumping and valving equipment is located to convey and direct heat transfer media through said heating and/or cooling loops.

16. The system of claim 1 wherein the at least one wind turbine comprises a height-adjustable wind turbine arranged to automatically adjust an elevation at which a rotor of the turbine resides according to optimize performance of the wind turbine based on airstream conditions at varying elevations.

17. The system of claim 16 wherein the height-adjustable wind turbine comprises a hydraulically operated mechanism used in raising of the rotor.

18. The system of claim 16 wherein the wind turbine comprises a telescopically expandable/collapsible tower atop which the rotor is carried.

19. The system of claim 18 wherein the telescopically expandable/collapsible tower comprises a static first base section containing a hydraulic fluid reservoir, and a height-adjustable second section comprising an annular chamber supported on the static base and into which hydraulic fluid from the reservoir is introducible to act against a lower end of a movable column of the second section that is telescopically received in the annular chamber to lift said movable column and thereby raise the rotor.

20. The system of claim 19 wherein the telescopically expandable/collapsible tower comprises a height-adjustable third section comprising an additional annular chamber supported on the movable column of the height-adjustable second section and into which the hydraulic fluid from the reservoir is introducible to act against a lower end of an additional movable column telescopically received in said additional annular chamber to lift said additional movable column and thereby raise the rotor.

* * * * *